United States Patent
Katayama

[11] Patent Number: 6,029,544
[45] Date of Patent: Feb. 29, 2000

[54] SINTERED DIAMOND DRILL BITS AND METHOD OF MAKING

[76] Inventor: Ichiro Katayama, Ohmori Sanno Homes 501, 3-31-21 Sanno, Ohta-ku, Tokyo 143, Japan

[21] Appl. No.: 08/753,919

[22] Filed: Dec. 3, 1996

Related U.S. Application Data

[62] Division of application No. 08/432,282, May 1, 1995, Pat. No. 5,611,251, which is a division of application No. 08/085,078, Jul. 2, 1993, Pat. No. 5,443,337.

[51] Int. Cl.$^7$ .................................................... B23B 27/20
[52] U.S. Cl. ................................... 76/108.6; 76/DIG. 12; 408/145
[58] Field of Search ........................ 76/108.6, DIG. 12; 408/144, 145, 230; 407/118, 119

[56] References Cited

U.S. PATENT DOCUMENTS

| | | | |
|---|---|---|---|
| 3,369,283 | 2/1968 | Colding | 76/DIG. 12 |
| 3,743,489 | 7/1973 | Wentorf, Jr. et al. | 51/307 |
| 4,702,649 | 10/1987 | Komanduri | 407/119 |
| 4,713,286 | 12/1987 | Bunting et al. | 428/323 |
| 5,031,484 | 7/1991 | Packer | 76/108.6 |
| 5,054,246 | 10/1991 | Phaal et al. | 407/118 X |
| 5,065,647 | 11/1991 | Johnson | 76/108.6 |
| 5,195,403 | 3/1993 | Sani et al. | 76/108.6 |
| 5,195,404 | 3/1993 | Notter et al. | 407/118 |
| 5,232,320 | 8/1993 | Tank et al. | 408/145 |
| 5,272,940 | 12/1993 | Diskin | 76/108.6 |
| 5,273,379 | 12/1993 | Nishimura | 76/108.6 X |
| 5,443,337 | 8/1995 | Katayama | 408/145 |
| 5,611,251 | 3/1997 | Katayama | 76/108.6 |

FOREIGN PATENT DOCUMENTS

| | | | |
|---|---|---|---|
| 4-152002 | 5/1992 | Japan | 408/144 |

*Primary Examiner*—Rinaldi I. Rada
*Assistant Examiner*—Boyer Ashley
*Attorney, Agent, or Firm*—William L. Chapin

[57] ABSTRACT

A drill bit for cutting hard and abrasive materials has cutting lips formed from sintered polycrystalline diamond (PCD) or polycrystalline cubic boron nitride (PCBN) contained in one or more inserts installed in a drill bit blank. The inserts are made by forming depressions in the upper surface of a matrix slab of tungsten carbide, filling the depressions with fine mesh grains of diamonds or cubic born nitride, subjecting the slab to heat and pressure sufficient to fuse the grains to one another and to the surrounding matrix walls, and then cutting the matrix slab to remove individual inserts containing an elongated vein having an exposed PCD or PCBN surface supported by at least one and preferably two or more side walls of tungsten carbide. A rectangular slot having side walls parallel to one another and equidistant from the diameter of a cylindrical drill bit blank is cut into one transverse end wall of the blank, and one or more inserts placed in the slot. The tungsten carbide walls of the inserts are then brazed to the adjacent side walls of the slot. The bit is then ground to a desired configuration, in which PCD or PCBN material forms at least part of at least one cutting lip of the finished drill bit. Preferably, flutes are formed in drill bit blank as part of the grinding operation.

6 Claims, 5 Drawing Sheets

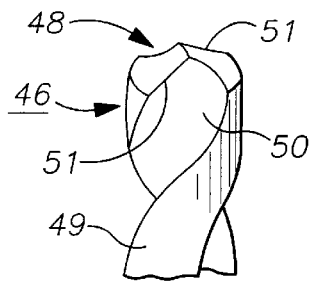
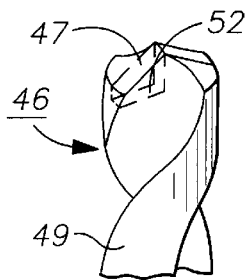
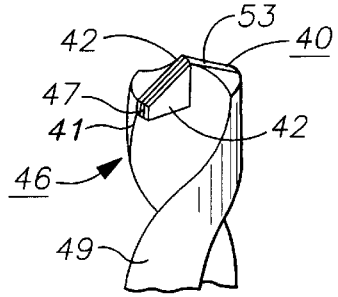
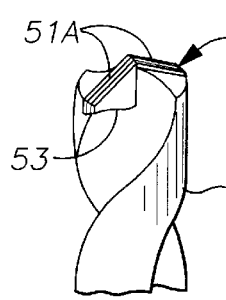
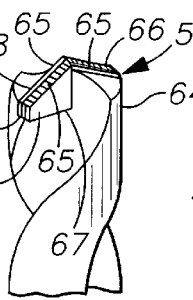
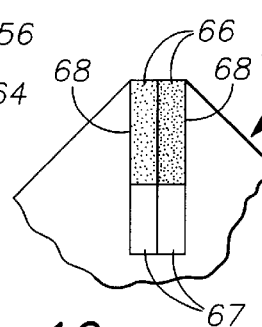
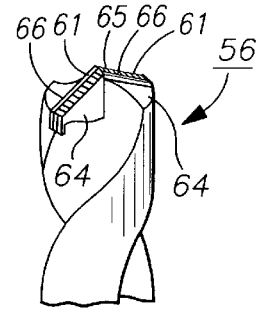
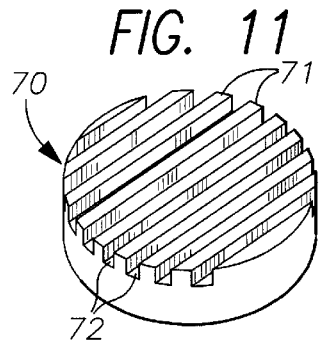
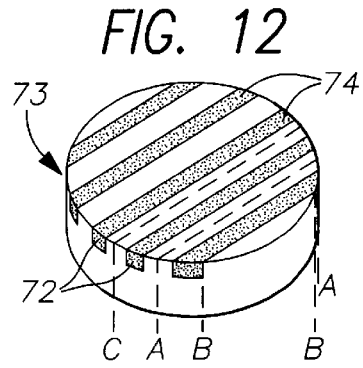
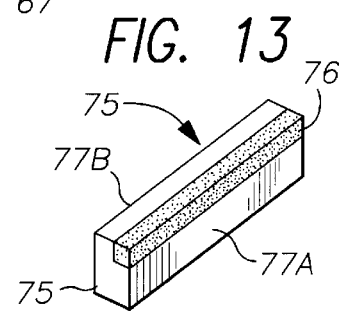
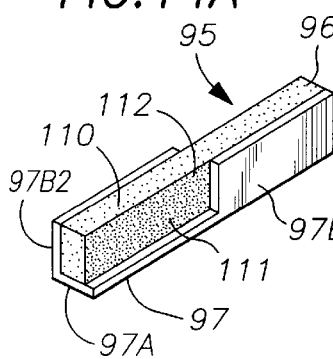
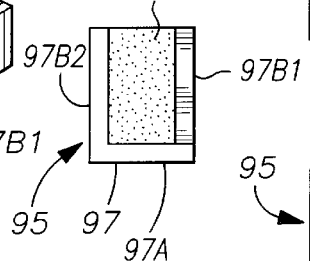
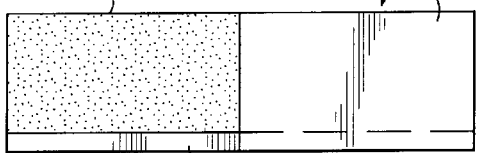
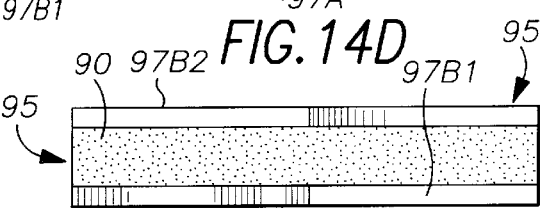

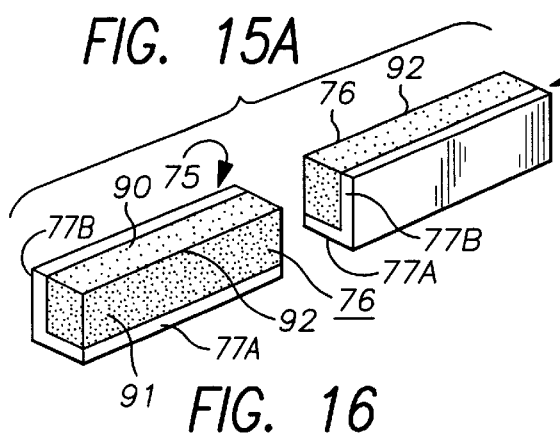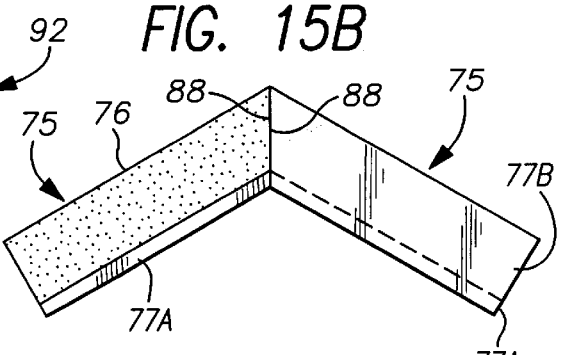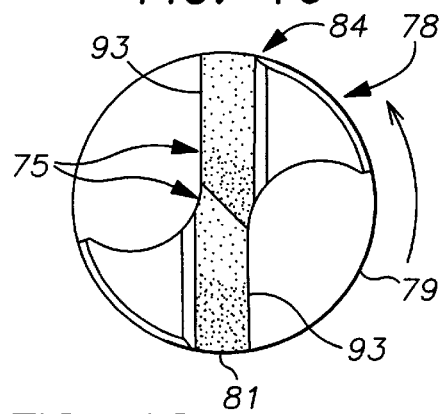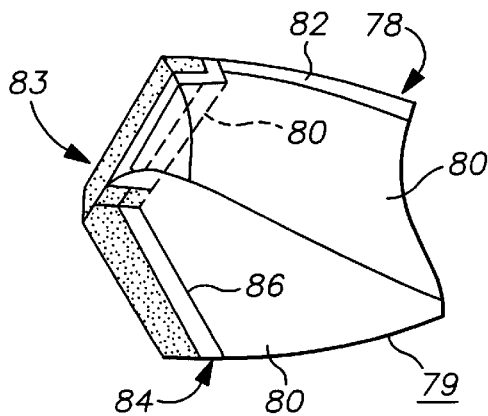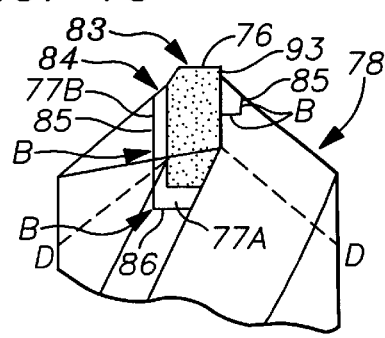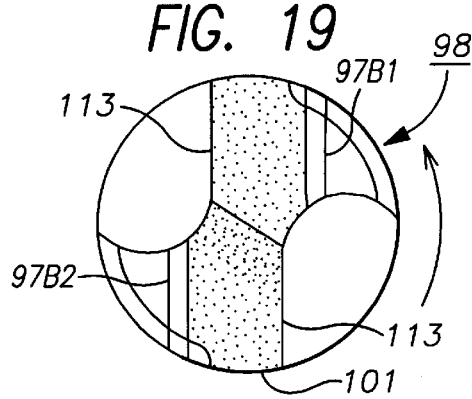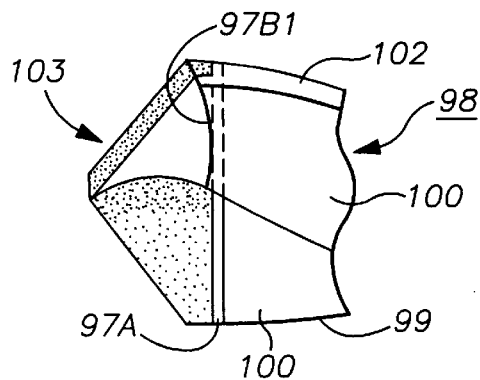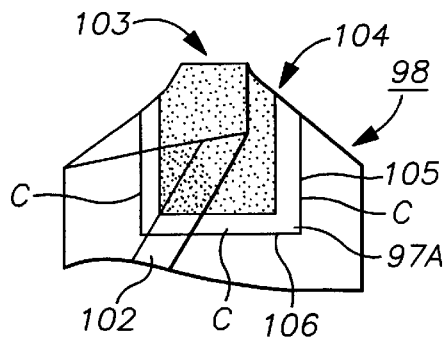

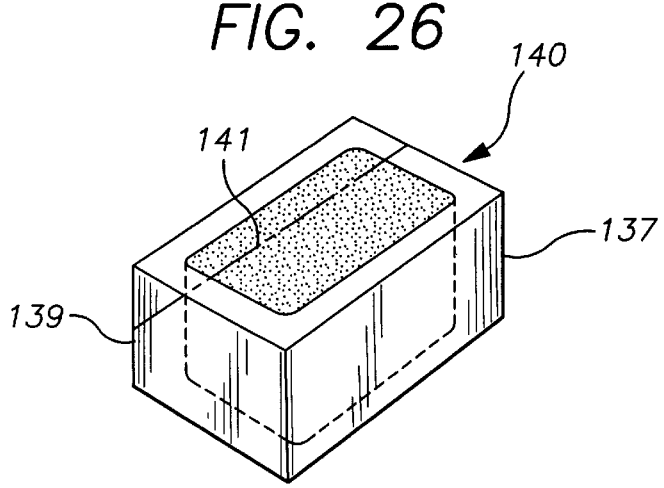
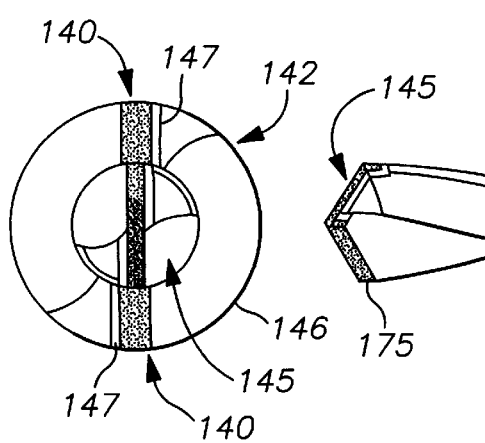
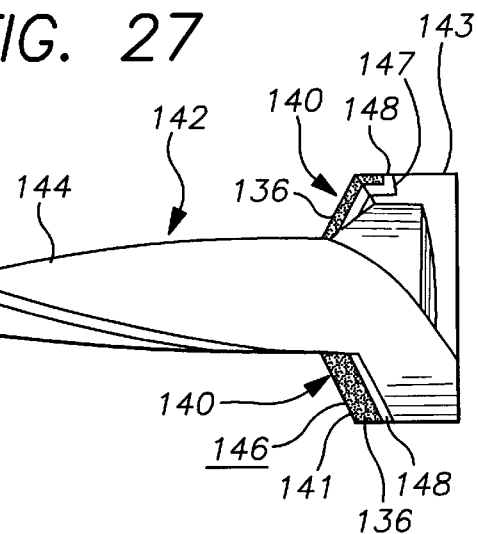
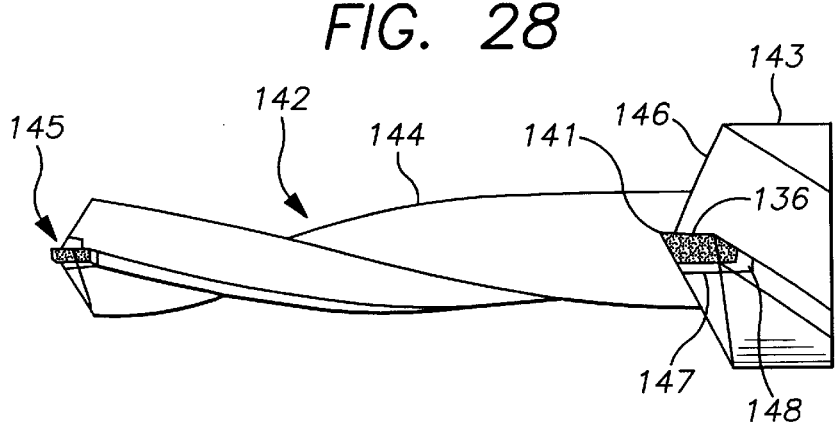

SINTERED DIAMOND DRILL BITS AND METHOD OF MAKING

This application is a division of application Ser. No. 08/432,282, filed May 1, 1995, now U.S. Pat. No. 5,611,251, which is in turn a division of application Ser. No. 08/085,078, filed Jul. 2, 1993, now U.S Pat. No. 5,443,337.

BACKGROUND OF THE INVENTION

A. Field of the Invention

This invention relates to cutting tools used for working hard or refractory materials. More particularly, the invention relates to an improvement in drill bits of the type having sintered diamond or boron nitride cutting edges, and a method of making the improved bits.

B. Description of Background Art

Cutting tools used to work hard or refractory materials have a relatively short life. Also, tools such as drill bits used in drilling or forming composites containing boron or carbon fibers used in the aircraft industry, as well as in other industries requiring high-strength, light-weight materials, experience rapid wear. Even the drilling of aluminum alloy engine blocks rapidly wears out steel drill bits.

In an effort to increase the wear resistance and life of steel twist drill bits used in applications of the type described above, as well as in the fabrication of such materials as fiberglass impregnated epoxy printed circuit boards, the tips of the bits are typically fabricated from a very hard substance such as tungsten carbide. However, even tungsten carbide is abraded fairly rapidly by composites such as printed circuit boards containing glass fibers. Thus, the bits must be re-sharpened or re-pointed relatively frequently, and eventually wear out. Therefore, even though tungsten carbide tipped drill bits last longer than all-steel bits, the downtime associated with re-sharpening and replacing carbide tipped drill bits is still a problem.

In an effort to further increase the life of drill bits used to work refractory materials, bits having harder cutting surfaces consisting of diamond or cubic boron nitride have been developed. One class of bits of this type has veins of polycrystalline diamond (PCD) or boron nitride (PCBN) material formed in the bit. Bits of this type generally employ grooves cut into a steel or tungsten carbide blank. Fine grains of PCD are packed into the grooves, and then subjected to great heat and pressure. This process causes the diamond grains to fuse to one another and to the carbide walls of the groove, thereby forming veins of hardened material. Drill bits of the type discussed above are disclosed in the following U.S. Pat. Nos.:

Bunting, et al., 4,713,286, Dec. 15, 1987, Printed Circuit Board Drill and Method of Manufacture:

Discloses a drill bit for printed circuit boards made from a conically pointed carbide blank brazed to a shank. A rectangular or hour-glass end view shape slot is cut longitudinally inward into the point, filled with diamonds or cubic boron nitride grains, which are then fused to the blank by the application of heat and pressure. Helical flutes are then cut into the blank, adjacent the sintered region, which forms the web, cutting lips, margins and lands of the finished drill bit. Bunting, 4,762,445, Aug. 9, 1988, Composite Sintered Twist Drill:

Discloses a drill bit in which a pair of non-aligned slots are cut into the tip of the drill, parallel to opposite sides of the web, filled with PCD material or boron nitride, and sintered under heat and pressure. In one embodiment the planes of the slots are parallel to the longitudinal axis of the drill bit. In a second embodiment the two slots are laterally displaced, and converge inwardly along the helix angles of the bit, and are joined at the tip by a longitudinally disposed central bore filled with sintered material.

Packer, 5,031,484, Jul. 16, 1991, Diamond Fluted End Mill:

Discloses an end mill made of tungsten carbide having grooves formed in the outer edges of helical cutting flutes formed therein. The grooves are packed with polycrystalline diamond powder or cubic boron nitride powder, which is sintered to the walls of the groove by the application of heat and pressure.

In another approach to providing a drill bit having cutting edges made of an extremely hard material such as diamond or cubic boron nitride, inserts containing PCD or PCBN are first fabricated, and then brazed into slots formed in a drill blank. Typically, these inserts take the form of a laminated, three layer structure or "sandwich" having two parallel outer walls made of a hard brazeable metal, such as tungsten carbide, and an inner layer of sintered diamonds or boron nitride grains. In plan view, inserts of this type usually have the shape of a chevron or pentahedron, the upper vertex of which forms the point of drill bit holding the insert. Such inserts are described in catalog #SD 1051 5M 64/91 published by Megadiamond, a Smith International, Inc. company, 275 West 2230 North, Provo, Utah 84604.

A disadvantage of the chevron or pentahedron sandwich form for PCD or PCBN inserts is that a relatively large portion of the PCD layer is remote from the cutting edge. Since the PCD material is quite expensive, it would be desirable to have a drill bit insert in which PCD material is located primarily on a cutting edge of a drill bit, rather than in an unused location. In an apparent effort to provide PCD drill bit inserts in which a minimum of PCD material is required, a modified PCD insert has been made available by De Beers Industrial Diamond Division, Charters Sunninghill Ascot, Berkshire, SL5 9PX England.

In De Beers'Syndite product announcement, titled Syndite, New Inserts For PCD-Tipped Drill Bits, a modified PCD insert for twist drills is disclosed, in which PCD material is confined largely to one oblique upper edge wall or "rooftop" of a pentahedral-shaped insert. Inserts of this type are fabricated by forming a surface layer of PCD material on a round or square base of brazeable matrix metal, and then cutting a rectangular or pentahedral-shaped piece from the PCD blank. In the case of the pentahedral cut, the base of the pentahedron is angled to the parallel upper PCD layer of the blank, so that PCD material lies on just one oblique upper wall or rooftop of the pentahedron. Two such pentahedrons are then placed side by side in a longitudinally disposed rectangular slot formed in the end of a drill bit blank. The PCD walls are on opposite sides of the bit, which is then machined to form a drill bit having two diametrically opposed, PCD cutting lips.

All of the drill bits employing PCD or PCBN cutting edges disclosed above have one or more less than optimum characteristics.

For example, bits having integral veins of fused PCD material are difficult and costly to fabricate, in part because of their complicated geometry.

Bits using chevron or pentahedral sandwich inserts require the grinding away of a substantial portion of one tungsten carbide outer face of a sandwich, in the formation of cutting lips. Moreover, the geometry of these inserts results in the depletion of PCD material after a relatively small number of re-grinds or repointings of a bit employing the insert.

In bits using a pentahedral insert having a PCD layer on an oblique surface or rooftop of the pentahedron, the exposed PCD layer is supported by fused PCD material only on its lower surface, rather than on a base and one side, as is the pentahedral or chevron sandwich type insert. Thus, drill bits using a pentahedral insert having a single PCD surface layer tend to be less rugged than bits using PCD sandwich inserts.

In view of the limitations of prior art drill bits employing PCD or PCBN veins or inserts described above, improved drill bits employing sintered PCD inserts, and methods of making the bits were conceived by the present inventor.

OBJECTS OF THE INVENTION

An object of the present invention is to provide an improved drill bit of the type used for cutting hard or refractory materials and having cutting edges or lips composed at least partially of polycrystalline diamond (PCD) or polycrystalline boron nitride (PCBN), or other such ultra-hard material, referred to collectively as PCD, the improvement including novel PCD inserts for drill bits and methods of making the inserts.

Another object of the invention is to provide an improved drill bit employing at least one cutting surface thereof an insert having a shallow vein or island of PCD material in a matrix of a brazeable substance.

Another object of the invention is to provide an improved drill bit in which an insert having the shape of a U-shaped channel of brazeable material filled with PCD grains fused to one another and to inner walls of the channel is brazed into a slot cut formed in the point of a drill bit blank, parallel to the web of the blank, and opposite outer lateral walls of the insert cut away to form PCD cutting lips.

Another object of the invention is to provide an improved drill bit in which a pair of inserts, each having the form of an L-shaped channel of brazeable material filled with PCD grains fused to one another and to the inner walls of the channel are brazed in a slot formed cut inward into the web of a drill bit blank, from the tip of the blank, parallel to the web, the exposed PCD walls of the two inserts lying on opposite sides of the web center line and thereby forming a pair of PCD cutting lips.

Another object of the invention is to provide a method for making PCD inserts for cutting tools, the method comprising the steps of forming slots or cavities in the upper surface of a slabshaped matrix made of a hard refractory material such as tungsten carbide, filling the slots or cavities with fine mesh grains of diamond or cubic boron nitride, subjecting the filled matrix to heat and pressure sufficient to fuse the diamond or cubic boron nitride grains to one another and to the surrounding matrix walls, and cutting out from said matrix individual inserts comprising a vein or island of PCD or PCBN material attached to a matrix segment.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends an improved drill bit structure for use with hard or refractory materials, and a method for making inserts for such drill bits, and for other cutting tools. The drill bits according to the present invention employ inserts brazed into slots formed in drill blanks made of high speed steel or tungsten carbide. The inserts have an exposed cutting surface made of grains of polycrystalline diamond (PCD) or cubic boric nitride (PCBN) that are fused together or sintered.

According to the present invention, a matrix having the shape of a thin slab with a generally flat upper surface is fabricated of tungsten carbide or similar hard, brazeable material.

The matrix slab typically has a flat lower surface parallel to the upper surface, and has a circular or rectangular plan-view shape. Depending on the particular drill bit application, rectangular slots or pockets are formed in the upper surface of the matrix slab, and then packed with fine mesh grains of PCD or PCBN. The filled slab is then subjected to high heat and pressure sufficient to cause the grains to fuse to one another and to the surrounding walls of the slot or pocket. By this means, veins or islands of fused PCD or PCBN material are formed in the slab.

The cylindrical or rectangular "chips" composed of PCD regions fused to a tungsten carbide matrix are cut to form individual inserts adapted to be fitted into one or more slots formed in a drill bit blank. The cuts are made so that at least one and preferably two or more side walls of tungsten carbide are left fused to the PCD veins. In the preferred embodiments, a single rectangular cross-section slot having side walls parallel to and equidistant from a diameter of a cylindrical drill bit blank is cut into a transverse end wall of the blank. The side walls of the insert are then brazed to the side walls of the drill bit slot. The drill bit with imbedded insert or inserts is then ground to a desired cutting geometry. Preferably, a cylindrical blank is used, the flutes, margins, cutting lips and conical point being formed in the blank after the inserts are installed in the blank.

BRIEF DESCRIPTION OF THE DRAWINGS

FIGS. 1 through 10 illustrate prior art drill bits.

FIG. 1 is a front elevation of a prior art pentahedral PCD sandwich type drill bit insert.

FIG. 2 is an upper plan-view of the insert of FIG. 1.

FIG. 3 is a side elevation view of the insert of FIG. 1.

FIG. 4 is a front elevation view of a prior art chevron sandwich type drill bit insert.

FIG. 5 is an upper plan-view of the insert of FIG. 4.

FIG. 6 is a side elevation view of the insert of FIG. 1.

FIGS. 7A–7C are upper perspective views of a prior art drill bit showing the method of attaching an insert of the type shown in FIGS. 1–3 thereto.

FIG. 8 is a view similar to that of FIG. 7, but showing the insert ground to a correct cutting geometry.

FIG. 9 is an upper perspective view of a prior art drill bit having a pair of inserts, of the type having a pentahedral rooftop PCD surface layer, brazed into a slot in the tip of the bit.

FIG. 10A is a view similar to that of FIG. 9, but showing the inserts ground to a correct cutting geometry.

FIG. 10B is a fragmentary side elevation view of the drill bit of FIG. 10A.

FIG. 11 is a perspective view of a slab of milled tungsten carbide matrix metal used to fabricate inserts according to the present invention.

FIG. 12 is a perspective view of the matrix slab of FIG. 11, in which grains of polycrystalline diamond or cubic boron nitride have been packed into slots in the slab, and fused thereto by the application of heat and pressure, to form a chip having veins of PCD material.

FIG. 13 is a perspective view of a first, edge vein type of insert that has been cut from the chip of FIG. 12.

FIG. 14A is a perspective view of a second, center vein type of insert that has been cut from the chip of FIG. 12.

FIG. 14B is an end elevation view of the insert of FIG. 14A.

FIG. 14C is a side elevation view f the insert of FIG. 4A.

FIG. 14D is an upper plan view of the insert of FIG. 14A.

FIG. 15A is a perspective view of a pair of edge-vein inserts of the type shown in FIG. 13, in the correct relative orientation for insertion into a drill bit.

FIG. 15B is a side elevation view of the inserts of FIG. 15A, showing transverse end walls of the inserts cut at an oblique angle, prior to being inserted into a drill bit.

FIG. 16 is a plan view of a drill bit with the inserts of FIG. 15 installed in a slot in the end of the bit.

FIG. 17 is a front elevation view of the drill bit of FIG. 16.

FIG. 18 is a side elevation view of the drill bit of FIG. 16.

FIG. 19 is a plan view of a drill bit with an insert of the type shown in FIG. 14A installed in a slot in the end of the bit.

FIG. 20 is a front elevation view of the drill bit of FIG. 19.

FIG. 21 is a side elevation view of the drill bit of FIG. 19.

FIG. 26 is a perspective view of an insert of the type shown in FIG. 25, that has been cut for use in a countersink.

FIG. 27 is a front elevation view of a countersink employing a pair of inserts of the type shown in FIG. 26.

FIG. 28 is a side elevation view of the countersink of FIG. 27.

FIG. 29 is a plan view of the countersink of FIG. 27.

DETAILED DESCRIPTION OF THE INVENTION

FIGS. 1–10 illustrate prior art drill bits having inserts composed in part of polycrystalline diamond (PCD) or polycrystalline boron nitride (PCBN). It should be understood that throughout this disclosure, PCD may be used generically to include polycrystalline diamond, polycrystalline boron nitride, or materials of similar great hardness. FIGS. 11–25 illustrate novel sintered diamond drill bits and manufacturing methods according to the present invention.

Figure 1:
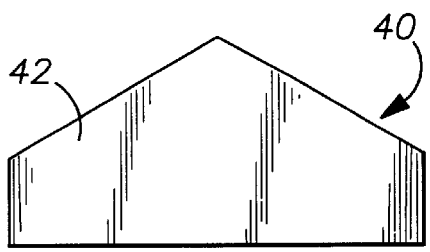
Figure 2:
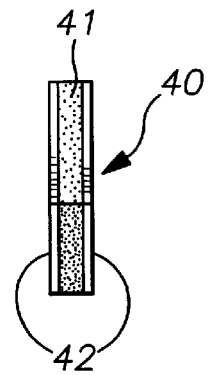
Figure 3:
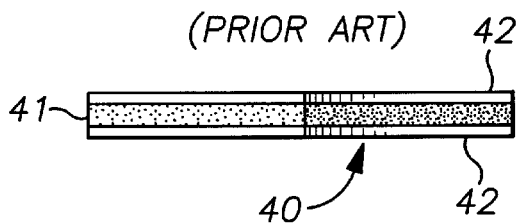

Referring first to FIGS. 1–3, a pentahedral-shaped prior art "sandwich" type insert for drill bits is shown. As may be seen best by referring to FIGS. 2 and 3, sandwich insert 40 includes a thin central PCD or PCBN layer 41. Hereinafter, PCD will be used to designate either PCD or PCBN material. PCD layer 41 is of generally uniform thickness, and sandwiched between a pair of thin, flat plates 42 made of a hard, brazeable material, such as tungsten carbide.

Figure 4:
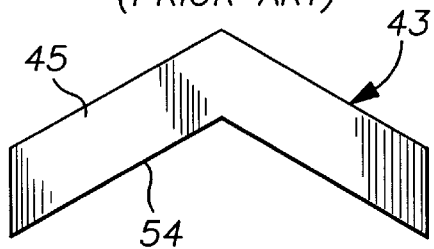
Figure 6:
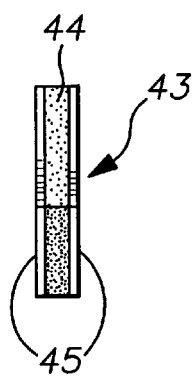
Figure 5:
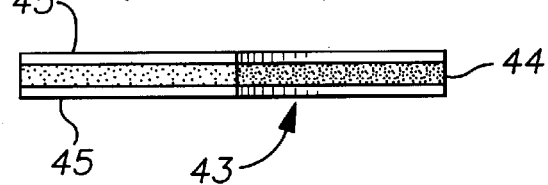
Figure 22:
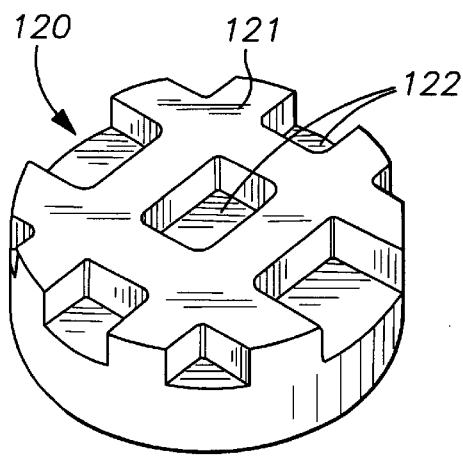
FIG. 22 is a perspective view of another type of matrix according to the present invention, in which shallow pockets rather than slots or grooves have been formed in the upper surface thereof.

FIGS. 4–6 show an insert 43 in which the pentahedral shape shown in FIGS. 1–3 is modified into a chevron shape. Chevron insert 43 has a central PCD layer 44 sandwiched between two brazeable metal plates 45. The purpose of modifying the pentahedral shape of insert 40 into the chevron shape of insert 43 is to minimize the amount of PCD material, which is required only along the cutting edges of a drill bit, as will be shown in FIGS. 7 and 8.

Referring to FIGS. 7A and 7B, a prior art drill bit 46 is shown in which a rectangular cross-sectional shaped slot 47 is milled into the point 48 longitudinally inward into body 49 of the bit.

As shown in FIGS. 7A and 7B, slot 47 is disposed parallel to web 50 of drill bit 46, and centered between opposed cutting lips 51 of the drill bit. As is also shown in FIG. 7B, slot 47 has a generally flat bottom wall 52.

FIG. 7C shows drill bit 46 with a pentahedral shaped sandwich insert 40, of the type shown in FIGS. 1–3, inserted into slot 47 of the bit. Insert 40 is usually secured in slot 47 by brazing outer sandwich plates 42 of the insert to those portions of web 50 forming the longitudinally disposed side walls of the slot.

After insert 40 has been brazed into slot 47 of drill bit 46, the two portions 53 of metal sandwich plates 42 protruding laterally outward from the original positions of cutting lips 51, FIG. 7A, are cut inwards toward the longitudinal center planes of the web and insert, thereby forming cutting lips 51A of a desired geometry and comprised at least partly of PCD material, as shown in FIG. 8.

Drill bits employing a chevron shaped sandwich insert 43, of the type shown in FIGS. 4–6, are fabricated in a manner substantially analogous to that described above for pentahedral sandwich insert 40. However, when chevron inserts are used, bottom wall 52 of slot 47 consists of two flat sections sloping downward from a vertex, corresponding in shape to bottom wall 54 of chevron 43, as shown in FIG. 4.

FIGS. 9, 10A and 10B illustrate another prior art drill bit construction using a pair of pentahedral-shaped inserts, each having a PCD layer on just one oblique wall surface or "rooftop" of the insert. As shown in FIGS. 9 and 10, drill bit 56 is structurally similar to drill bit 46 shown in FIGS. 7A–8, and has a slot 57 formed in the end thereof. As shown in FIG. 9, slot 57 receives a pair of pentahedral-shaped inserts 64, each having a PCD layer 65 on one of its two oblique upper walls 66. The two pentahedral inserts 64 are oriented side by side, but with their respective PCD layers diametrically opposed, thus placing a separate PCD layer adjacent each of the two diametrically opposed cutting lips 61 of drill bit 56. As may be seen best by referring to FIG. 10B, each pentahedral insert 64 may be brazed to drill bit 56 along base 67 and one side wall 68, the adjacent side walls 68 of a pair of inserts 64 may also be brazed to one another.

With the preceding description of prior art drill bits using PCD inserts in mind, the advantages of the novel sintered diamond drill bits fabricated according to the method of the present invention may be better appreciated.

With reference now to FIGS. 11 through 25, and particularly to FIG. 11, a slab 70 of a hard, brazeable material, preferably tungsten carbide, is shown. As shown in FIG. 11, slab 70 has a circular plan-view shape. However, this shape is not critical, and may be oval, square or rectangular, for example. Preferably, slab 70 initially has flat, parallel upper and lower surfaces for ease of fabrication. As shown in FIG. 11, upper wall surface 71 of slab 70 has formed therein a plurality of parallel, rectangular cross-section slots 72. Although slots 72 may be formed by any suitable means, they are preferably formed by Electrical Discharge Machining (EDM), which is a particularly effective method of machining tungsten carbide.

As shown in FIG. 12, slots 72 are packed with a fine mesh powder of polycrystalline diamonds (PCD) or polycrystalline boron nitride (PCBN). Thus filled, slab 70 is then subjected to heat and pressure sufficient to sinter or fuse the powder grains to one another and to the slot walls. Methods and apparatus for performing such sintering, which require pressures of the order of a million pounds per square inch and temperatures of about 1,200° C. to 1,600° C., are disclosed in U.S. Pat. Nos. 2,941,248, 3,141,746, and 3,743,489. The aforementioned references describing thermocompression sintering are incorporated herein by reference.

Referring now to FIG. 12, as a result of the sintering process described above, slab 70 is formed into a "chip" 73 containing elongated rectangular cross-section "veins" 74 of PCD material fused into the surface of a tungsten carbide matrix. Drill bit inserts according to the present invention are fabricated by cutting chip 73, as follows.

Referring to FIGS. 12 and 13, a pair of saw cuts A—A and B—B parallel to one another and to a vein 74 are made through the thickness dimension of chip 73. One cut, A—A for example, is made in a plane laterally spaced apart from a vein 74. The second cut, B—B, is made in plane flush with one long vertical side wall of vein 74, thus forming an insert 75 having an exposed PCD edge wall, as shown in FIG. 13. Insert 75 has the shape of an elongated rectangular block 76 of PCD material lying in an L-shaped channel 77 of tungsten carbide matrix material. Channel 77 has an elongated rectangular base 77A and an elongated rectangular upright leg 77B. As shown in FIG. 15A, base 77A and leg 77B of channel 77 are preferably cut or subsequently ground to uniformly thin cross sections.

FIGS. 16 through 18 illustrate an improved drill bit 78 utilizing a pair of edge-vein inserts 75, oriented generally as shown in FIGS. 15A and 15B. As may be seen best by referring to FIGS. 16 through 18, drill bit 78 has an elongated, generally circular cross-section body 79 in which are formed a pair of longitudinally disposed, diametrically opposed helical flutes 80. Body 79 is preferably made of high carbon steel or tungsten carbide.

Running lengthwise between flutes 80 is a web 81 formed between two parallel chords located on opposite sides of a diameter bisecting the flutes, and equidistant from the diameter, as shown in FIG. 16. As may be seen best by referring to FIG. 17, the outer circumferential edge wall of each flute 80 comprises a narrow helically curved strip 82 referred to as a margin. Drill bit 78 includes a generally conically shaped forward end or point 83.

As may be seen best by referring to FIG. 18, a rectangular cross-section slot 84 having parallel, longitudinally disposed outer walls 85 is cut longitudinally inwards into web 81 from the apex of point 83. As shown in FIGS. 17 and 18, slot 84 has a pair of generally flat bottom walls 86 which intersect opposite margins 82. As may be seen best by referring to FIG. 17, bottom walls 86 of slot 84 intersect at a longitudinally disposed bisecting plane of body 79 in an oblique dihedral angle. Slot 84 may be cut by any suitable means, but preferably by electrical discharge machining (EDM).

Referring now to FIGS. 15A, 15B and 16, drill bit 78 is shown to include a pair of inserts 75 placed end-to-end in slot 84. As shown in FIG. 15A, inserts 75 are oriented in a reversed mirror symmetric, or anti-symmetric, alignment, i.e., with the base legs 77A of the insert channels 77 in abutting contact, but with the upright legs 77B, on opposite lateral sides. Thus positioned, upright leg 77B of each insert 75 abuts PCD block 76 of the other insert. Prior to placement in slot 84, the two adjacent transverse end faces 87 of each insert 75 are machined to form an obliquely disposed end wall 88.

As shown in FIG. 15B, end walls 88 of inserts 75 are cut along an oblique plane whose trace in the upper wall surface 90 of the insert is perpendicular to side channel member 77B of the insert, i.e., along a face diagonal. In this embodiment, end walls 88 of inserts 75 form a miter joint, intersecting at a dihedral angle along a longitudinal center plane of body 79 of drill bit 78, as shown in FIG. 16.

Inserts 75 are secured in slot 84 by brazing channel members 77A and 77B to adjacent wall surfaces of slot 84, at locations indicated by the letter B in FIG. 18. After the brazing operation, point 83 and the adjacent end portion of body 79 of drill bit 78 are ground to a desired cutting geometry. In the preferred embodiment, drill bit 78 is fabricated by first cutting a slot 84 in a cylindrical blank, which is fluted after inserts are brazed into the slot.

As shown in FIG. 15A, upper side wall 90 and outer side wall 91 of PCD core 76 of each insert 75 intersect at a longitudinally disposed corner edge 92. When inserts 75 are installed in drill bit 78, as shown in FIG. 16, corner edges 92 of an insert pair form cutting lips 93.

FIGS. 17 through 18 illustrate important advantages of the novel drill bit construction according to the present invention. Thus, as shown in FIG. 18, PCD block 76 having cutting lip 93 is supported by a rugged L-shaped tungsten carbide matrix fused to the PCD block. The base of PCD block 76 is securely held by a bottom member 77A of L-shaped tungsten carbide matrix channel 77. Also, that portion of PCD block 76 rearward of cutting lip 93 is supported by the upright member 77B of carbide matrix channel 77. This support minimizes the possibility of breakage of the PCD block away from matrix channel 77 when subjected to large tangential shear forces produced by contact of cutting lip 93 with the wall of a hole being drilled.

As shown by intersecting phantom lines D—D in FIG. 18, drill bit 78 can be re-pointed a substantial number of times, before depletion of the PCD material in PCD block 76.

FIGS. 19–21 illustrate another embodiment of a drill bit according to the present invention. In the embodiment shown in FIGS. 19–21, center-vein inserts of the type shown in FIGS. 14A–14D are employed.

Referring first to FIGS. 12 and 14A, a second, center vein type insert 95 is shown, that is cut from chip 73 by a pair of parallel saw cuts A—A and C—C which are equidistant from a vein 74 in the chip. As shown in FIGS. 14A through 14D, insert 95 has the shape of an elongated rectangular block 96 of PCD material imbedded in a U-shaped channel 97 of tungsten carbide matrix material. Channel 97 has an elongated rectangular base 97A and a pair of parallel upright side legs 97B. As shown in FIGS. 14B and 14C, base 97A and side legs 97B are preferably cut or ground to uniformly thin cross-sections.

Referring now to FIGS. 19–21, an improved drill bit 98 utilizing a single center-vein insert 95 is shown. As may be seen best by referring to FIGS. 20 and 21, drill bit 98 has an elongated, generally circular cross-section body 99 in which are formed a pair of longitudinally disposed, diametrically opposed helical flutes 100. Body 99 is preferably made of high carbon steel or tungsten carbide. Running lengthwise between flutes 100 is a web 101 located between two parallel chords positioned on opposite sides of a diameter bisecting the flutes, and equidistant from the diameter, as shown in FIG. 19. As may be seen best by referring to FIG. 20, the outer circumferential edge wall of each flute 100 comprises a narrow, helically curved rectangular strip or margin 102. Drill bit 98 includes a generally conically shaped tip or point 103.

As may be seen best by referring to FIG. 21, a rectangular cross-section slot 104 having parallel, longitudinally disposed side walls 105 is cut longitudinally inwards into web 101 from the apex of point 103. As shown in FIG. 21, slot 104 has a generally flat bottom wall 106 which intersects opposite margins 102. Slot 104 may be cut by any suitable means, but preferably by electrical discharge machining (EDM).

Referring now to FIGS. 14A–14D and 19, drill bit 98 is shown to include a single insert 95 inserted into slot 104. Insert 95 is secured in slot 104 by brazing channel members 97A and 97B of the insert to adjacent wall surfaces of slot 104, at locations indicated by the letter C in FIG. 21. After the brazing operation, point 103 and the adjacent portion of body 99 of drill bit 98 are ground to a desired cutting geometry. As may be seen best by referring to FIG. 19, approximately one longitudinal half of a side leg 97B1 is removed as part of the grinding operation, exposing PCD block 96. Also, as may be seen best by referring to FIGS. 14D and 19, the opposite longitudinal half of the opposite side leg 97B2 is also cut away to expose PCD block 96. Alternatively, the longitudinal portion of side legs 97B1 and 97B2 may be partially or wholly removed prior to installation of insert 95 in drill bit 98.

In the preferred embodiment, drill bit 98 is fabricated by first cutting a slot 104 in a cylindrical blank, which is fluted after insert 95 is brazed into the slot.

As may be seen best by referring to FIG. 14A, upper side wall 110 and outer side wall 111 of PCD core 96 of insert 95 intersect at a longitudinally disposed corner edge 112. When insert 95 is installed in drill bit 98, as shown in FIG. 19, corner edges 112 of insert 95 form cutting lips 113.

FIGS. 22 through 25 illustrate a method for making another type of cutting bit according to the present invention. In this embodiment of the invention, a slab 120 of generally uniform thickness and made of a hard, brazeable material such as tungsten carbide has formed in the upper surface 121 thereof a plurality of shallow pockets 122. Although the pockets shown in FIGS. 22 and 23 have a generally rectangular plan-view shape, other polygonal shapes, such as square or triangular, or curvilinear, such as circular or oval, may be useful for certain applications. Pockets 122 are formed in upper surface 121 of slab 120 by any suitable means, but preferably by EDM.

Figure 23:
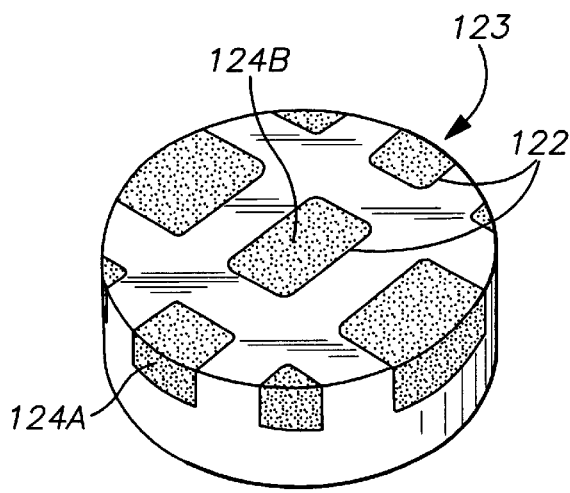
FIG. 23 is a view similar to that of FIG. 22, but showing PCD islands formed in the pockets.
Figure 24:
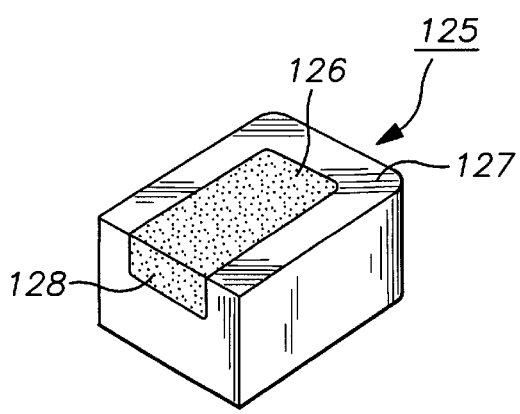
FIG. 24 is a perspective view of a first, edge vein type of insert that has been cut from the chip of FIG. 23.

As shown in FIG. 23, pockets 122 of slab 120 are packed with a fine mesh powder of polycrystalline diamonds (PCD) or polycrystalline boron nitride (PCBN). Filled slab 120 is then subjected to heat and pressure sufficient to sinter or fuse the powder grains to one another and to the walls of a surrounding pocket 122, in the manner described previously for slab 70 in conjunction with FIGS. 11 and 12. This process forms a "chip" 123 containing "islands" 124 of PCD or PCBN grains fused into a tungsten carbide matrix. Islands 124A having one vertically disposed edge of exposed PCD material, and 124B having no exposed lateral edge are shown in FIG. 23. Chip 123 may then be cut to produce a cutting tool insert 125 having a block or island of PCD material 126 imbedded in a block 127 of tungsten carbide material, as shown in FIG. 24. As shown in FIG. 24, insert 125 has one edge wall 128 of PCD block exposed.

Figure 25:
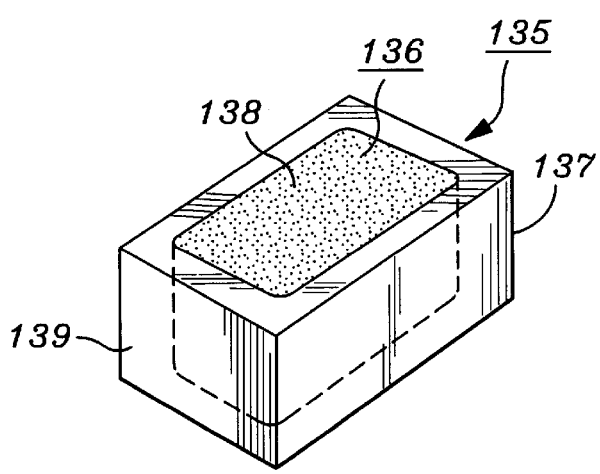
FIG. 25 is a perspective view of a second, center vein type of insert that has been cut from the chip of FIG. 23.

FIG. 25 illustrates another type of insert 135 which may be severed from chip 123. Insert 135 consists of a block of PCD material 136 which is entirely surrounded by a tungsten carbide matrix 137, except for the upper surface 138 of the PCD block.

FIGS. 26 through 29 illustrate how an insert of the type shown in FIG. 25 may be employed in a countersink.

As shown in FIG. 26, insert 135 may be cut on an oblique plane intersecting both upper surface 138 of PCD block 136 and a side wall 139 of the insert, thus producing a modified insert 140 having an acutely angled linear cutting edge 141 of PCD material. Insert 140 is used in countersink 142 as will now be described.

Referring now to FIGS. 27 through 29, a countersink 142 is shown having an elongated cylindrical shank 143 and an elongated reduced diameter body 144 provided with a conically-shaped cutting point 145. Preferably, cutting point 145 is constructed as shown in FIGS. 16 through 18, using a pair of the novel sintered PCD inserts 175, similar to inserts 75 shown in FIG. 13 and described above. Alternatively, cutting point 145 may be provided with a single PCD insert of the novel type shown in FIGS. 14A–14D, in a construction of the type shown in FIGS. 19–21 and described above. Countersink 142 may even have a conventional cutting point not provided with the novel PCD inserts described above, for certain applications.

As may be seen best by referring to FIGS. 27 and 28, countersink 142 has a generally frustro-conically-shaped transition section 146 joining shank 143 to reduced diameter body 144. Transition section 146 is provided with cutting surfaces provided by modified inserts 140 for boring a larger diameter hole concentric with a hole bored by cutting point 145. Thus, as shown in FIGS. 27 and 29, a pair of inserts 140 is brazed to diametrically opposed sides of transistion section 146. As may be seen best by referring to FIG. 28, each insert 140 has a linear acutely angled cutting edge 141 made of PCD material 136. As shown in FIG. 28, PCD material 136 is supported on two sides by side walls 147 and 148 of tungsten carbide matrix of the PCD material. Both side walls are brazed to transition section 146 of countersink 142. Thus, countersink 142 has a substantially stronger counterboring cutting construction than prior art PCD counterbores, which employ a matrix having a single attachment wall, such as wall 147.

What is claimed is:

1. A method for making inserts for cutting tools comprising;
   a. fabricating a generally slab-shaped matrix of brazable material,
   b. forming in an upper wall surface of said matrix at least one depression having a perimeter lying in said upper wall surface,
   c. filling said depression with grains of refractory material selected from the group consisting of diamond and cubic boron nitride to thereby form a filled matrix having no more than one wall of said filled matrix exposed,
   d. subjecting said filled matrix to heat and pressure sufficient to cause grains of said refractory material to fuse to one another and to adjacent walls of said depression, thereby forming a polycrystalline body, and
   e. making a cut in said filled matrix to form at least one insert having a region of polycrystalline material exposed, said cut being made into said matrix along a line parallel to a segment of said perimeter of said depression, said cut being spaced apart from at least three side walls of said depression, whereby said insert has at least three supporting side walls and a base wall made of brazable matrix material.

2. The method of claim 1 wherein said perimeter of said depression is further defined as having a polygonal shape.

3. The method of claim 1 wherein said cut is further defined as being perpendicular to said upper wall surface of said matrix.

4. The method of claim 1 wherein at least a second depression is formed in said upper wall surface of said matrix, thereby forming a plurality of depressions.

5. The method of claim 1 wherein said brazable material is further defined as being a carbide.

6. The method of claim 1 wherein said brazable materiai is further defined as being tungsten carbide.

* * * * *